United States Patent
Aguilera Ramirez et al.

(10) Patent No.: US 10,112,555 B2
(45) Date of Patent: Oct. 30, 2018

(54) PACKAGE TRAY UMBRELLA HOLDER

(71) Applicant: FORD GLOBAL TECHNOLOGIES, LLC, Dearborn, MI (US)

(72) Inventors: Miguel Alfonso Aguilera Ramirez, Mexico DF (MX); Eduardo Arturo Aguilar Ruelas, Mexico City (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 51 days.

(21) Appl. No.: 15/397,164

(22) Filed: Jan. 3, 2017

(65) Prior Publication Data
US 2018/0186307 A1  Jul. 5, 2018

(51) Int. Cl.
| | |
|---|---|
| *B60R 11/00* | (2006.01) |
| *B60R 13/07* | (2006.01) |
| *B60R 5/04* | (2006.01) |
| *B60R 7/02* | (2006.01) |
| *B60R 7/12* | (2006.01) |

(52) U.S. Cl.
CPC ............... *B60R 13/07* (2013.01); *B60R 5/04* (2013.01); *B60R 5/044* (2013.01); *B60R 7/02* (2013.01); *B60R 7/12* (2013.01)

(58) Field of Classification Search
CPC ............. B60R 13/07; B60R 7/02; B60R 7/12
See application file for complete search history.

(56) References Cited

U.S. PATENT DOCUMENTS

| | | | |
|---|---|---|---|
| 4,378,888 A | 4/1983 | Reed | |
| 5,129,615 A | 7/1992 | Strauss | |
| 5,441,183 A * | 8/1995 | Frenzel | B60R 7/02 224/542 |
| 5,685,591 A * | 11/1997 | Simplicean | B60R 11/02 224/275 |
| 5,800,004 A * | 9/1998 | Ackeret | B60R 7/046 224/915 |
| 5,964,491 A * | 10/1999 | Marsh | B60R 5/044 224/275 |
| 6,095,388 A * | 8/2000 | Neville, Sr. | B60R 7/12 211/62 |
| 2005/0253426 A1* | 11/2005 | Wesling | B60N 2/879 297/188.01 |
| 2006/0065687 A1* | 3/2006 | Reed | B60P 1/003 224/404 |
| 2007/0241582 A1 | 10/2007 | McKeever | |
| 2009/0001749 A1* | 1/2009 | Johnson | B60R 7/043 296/37.15 |
| 2017/0174141 A1* | 6/2017 | Jhant | B62D 21/183 |

FOREIGN PATENT DOCUMENTS

DE  199 53 479 A1  5/2001

* cited by examiner

*Primary Examiner* — Lori L Lyjak
(74) *Attorney, Agent, or Firm* — Vichit Chea; Brooks Kushman P.C.

(57) ABSTRACT

A vehicle cargo space comprising a package tray and an umbrella drainage system is disclosed. The package tray cooperates with a rear seat defining a cargo area beneath the package tray. The package tray has an umbrella storage receptacle with a drain hole. The umbrella drainage system has a flexible hose within the cargo area. The hose is fluidly connected to the package tray and a body drainage system such that water drains from the receptacle into the hose for expulsion via the body drainage system.

20 Claims, 4 Drawing Sheets

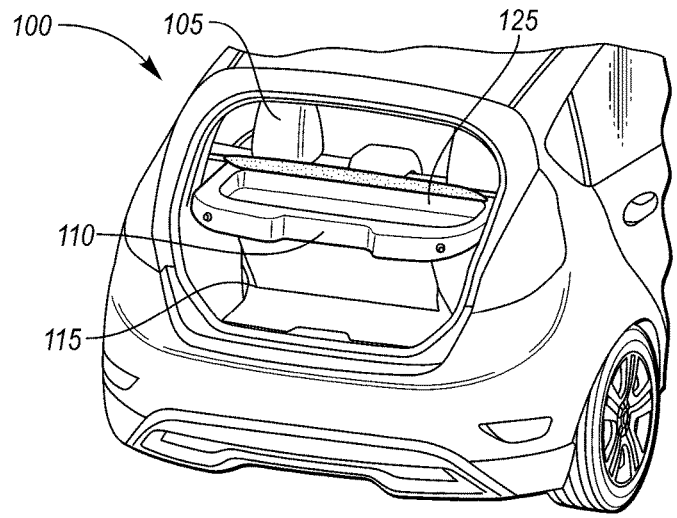
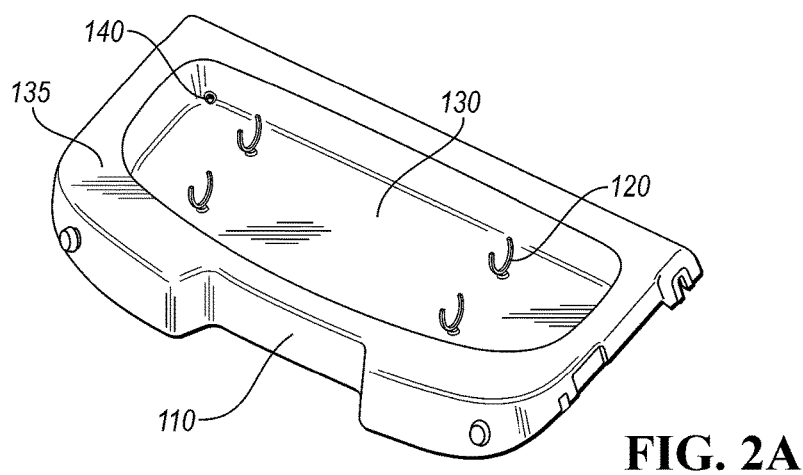
FIG. 1
FIG. 2A
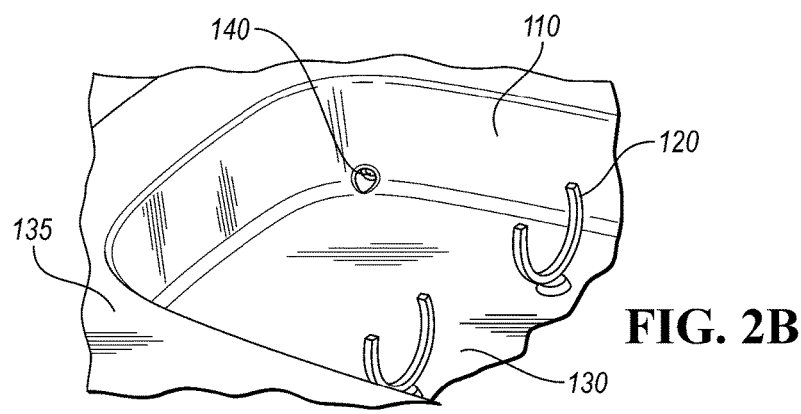
FIG. 2B

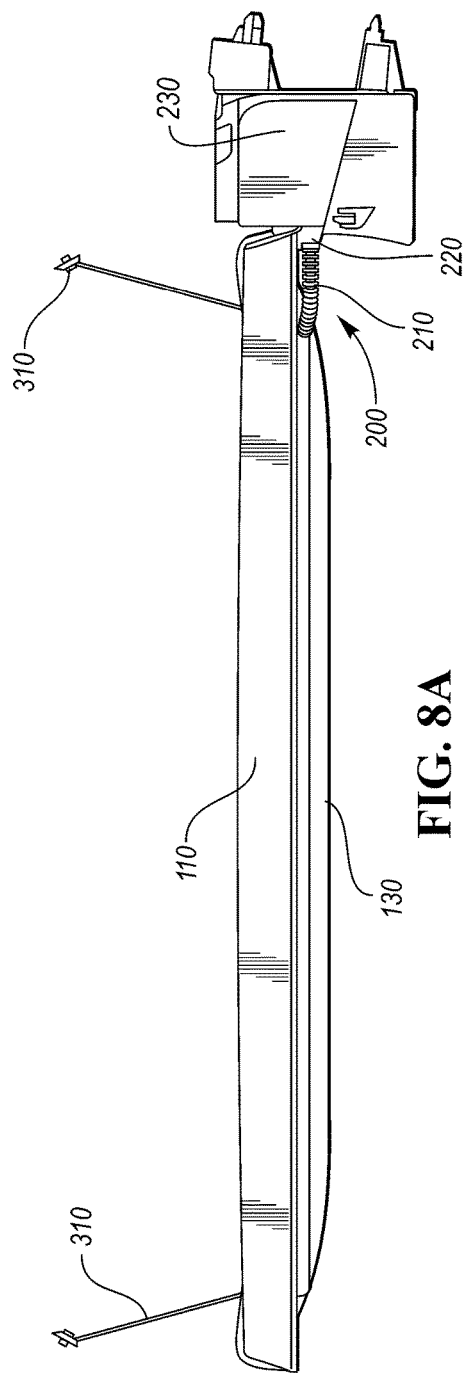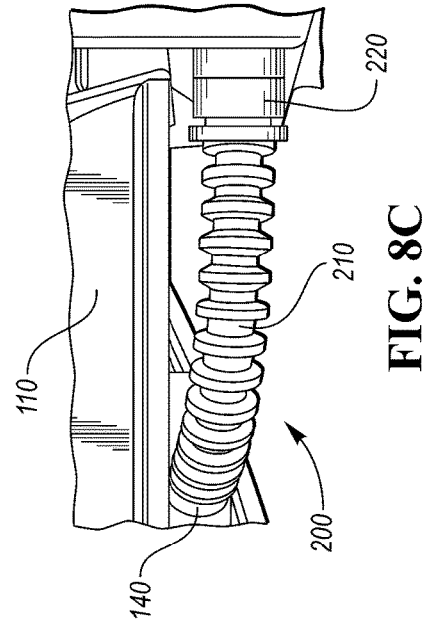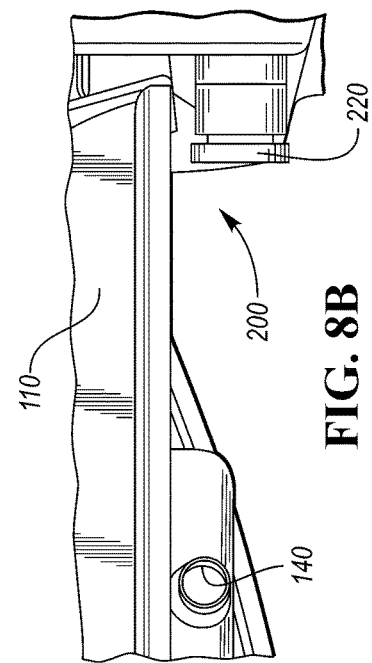

PACKAGE TRAY UMBRELLA HOLDER

TECHNICAL FIELD

The present disclosure relates to a package tray for a vehicle. In particular, the disclosure relates to design features to hold and drain water from umbrellas in a vehicle cargo area.

BACKGROUND

Vehicles have cargo areas to aid in storing items, such as umbrellas. The cargo areas may be covered by a panel or package tray. Umbrellas are kept in vehicles for use during rain storms to get from the vehicle to a building. Typically, umbrellas are stored in the cargo area, package tray, or on the floor of the vehicle cabin.

SUMMARY

According to one embodiment, a vehicle cargo space comprising a package tray and an umbrella drainage system is disclosed. The package tray cooperates with a rear seat defining a cargo area beneath the package tray. The package tray has an umbrella storage receptacle with a drain hole. The umbrella drainage system has a flexible hose within the cargo area. The hose is fluidly connected to the package tray and a body drainage system such that water drains from the receptacle into the hose for expulsion via the body drainage system. The umbrella storage receptacle may have an angled surface to promote water flow due to gravitational force. The umbrella storage receptacle may include at least one c-clip configured to retain at least one umbrella. The umbrella drainage system may be connectable to the body drainage system via a push-in connector. The receptacle of the package tray may be impervious to water. The vehicle cargo space may also include a hinged cover configured to enclose the umbrella storage receptacle in a closed position and reveal the umbrella storage receptacle in an open position. The body drainage system may be an existing water drainage system cooperating with cavities in a vehicle frame.

According to another embodiment, an umbrella drainage system for a vehicle is disclosed. The umbrella drainage system comprises a flexible hose located in a cargo area defined by a rear seat and a package tray. The hose is fluidly cooperable with a drain hole in a lower end of an angled surface of the tray and a body drainage system. The hose is fluidly cooperable such that water flows from stored umbrellas down the angled surface through the drain hole and hose for expulsion through the body drainage system. The flexible hose may be removably connected to the body drainage system via a push-in connector. The umbrella drainage system may further include a hinged cover configured to cover the package tray in a closed position and uncover the package tray in an open position. Umbrellas may be retained on the angled surface by at least one c-clip. The angled surface of the package tray may be impervious to water. The body drainage system may be an existing water drainage system cooperating with cavities in a vehicle frame.

According to another embodiment, an umbrella storage system for a vehicle is disclosed. The umbrella storage system comprises a package tray for a vehicle cargo space, and at least one umbrella holder. The package tray has an angled surface, a frame around the surface defining a storage cavity, and a drain hole. The at least one umbrella holder is located on the surface for storing umbrellas in the storage cavity. The angled surface is configured to drain water from stored umbrellas through the drain hole due to gravity. The umbrella storage system may further comprise a flexible hose connectable to the package tray at one end such that the hose fluidly cooperates with the drain hole, and connectable to a vehicle drainage system at a distal end such that the hose fluidly cooperates with the vehicle drainage system. The flexible drain hose may be connected by a push-in connector. The umbrella storage system may further comprise a hinged cover configured to cover the storage cavity in a closed position and reveal the storage cavity in an open position. The umbrella holder may be a c-clip. The umbrella holder may be a hook and loop fastener (e.g., VELCRO™). The angled surface may be impervious to water.

BRIEF DESCRIPTION OF THE DRAWINGS

FIG. 1 is a partial perspective rear view of an exemplary vehicle having cargo area with a package tray.

FIG. 2A is a perspective view of a package tray for a cargo area.

FIG. 2B is an enlarged partial perspective view of the package tray for a cargo area.

FIG. 8A is a rear view of a package tray for a cargo area of a vehicle.

FIG. 8B is an enlarged partial rear view of the package tray of FIG. 8A.

FIG. 8C is an enlarged partial rear view of the package tray of FIG. 8A.

DETAILED DESCRIPTION

Figure 3A:
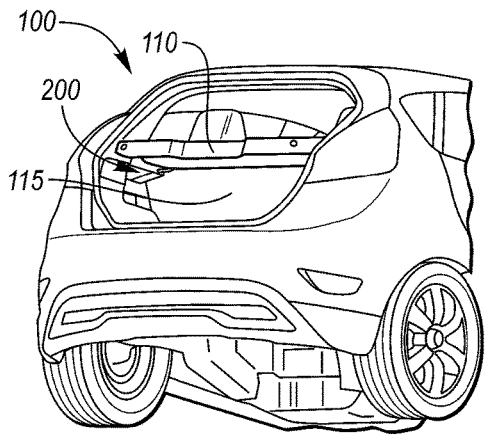
FIG. 3A is a partial perspective rear view from a different angle of an exemplary vehicle having a cargo area with a package tray.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 depicts the rear view of a typical vehicle 100, having a cargo area 115 and an open tailgate (door not illustrated) for ease of access to the cargo area 115. The vehicle 100 illustrated with such a cargo area 115 is a 5-door vehicle. Other vehicles having a cargo area include, but are not limited to, station wagons, estate cars, sport utility vehicles (SUV), vans, and trucks. Cargo area 115 is defined by rear seat 105 of vehicle 100 and the body of vehicle 100. Rear seat 105 divides the passenger area (not shown) of vehicle 100 with the cargo area 115. Package tray 110 is located behind rear seat 105 and defines a top boundary of cargo area 115. Package tray 110 may be connected to rear seat 105, the vehicle 100 body, and/or the rear door (not shown). The package tray 110 includes an umbrella storage receptacle 125 defined as a cavity within the package tray 110.

FIGS. 2A and 2B depict the package tray 110. The umbrella storage receptacle 125, or storage cavity, in the package tray 110 is defined by package tray frame 135. The umbrella storage receptacle 125 has an angled surface 130 for promoting water flow via gravitational force, defining the bottom of the umbrella storage receptacle 125 and package tray 110. At the lower end of the angled surface 130, a drain hole 140 is defined by and located in the frame 135 of the package tray 110.

Umbrella holders 120 are located on the angled surface 130 within the umbrella storage receptacle 125 to retain at least one umbrella in the package tray 110. Each umbrella holder 120 may be, but is not limited to, a c-clip, a hook and loop fastener (e.g., VELCRO™) patch, belt, or strap. The umbrella holders 120 allow at least one umbrella to be held in place to prevent noise caused by rattling, damage to other objects in the cargo area 115, damage to the umbrellas, and harm to passengers in the event of an accident. The umbrella holders 120 are attached to the angled surface 130 of the umbrella storage receptacle 125, and may be oriented in any direction to maximize the umbrella storage capacity.

Typically, umbrellas are stored after use in the umbrella storage receptacle 125 of the package tray, and held via the umbrella holders 120. Water from stored umbrellas drips onto the angled surface 130, and flows down the angled surface 130 due to gravitational force. The water exits the drain hole 140 for expulsion via an umbrella drainage system, discussed below. The angled surface 130 may be made of any water proof, water resistant, or water repellant material such that the receptacle of the package tray 110 is impervious to water to prevent any humidity odors from the package tray 110.

Figure 3B:
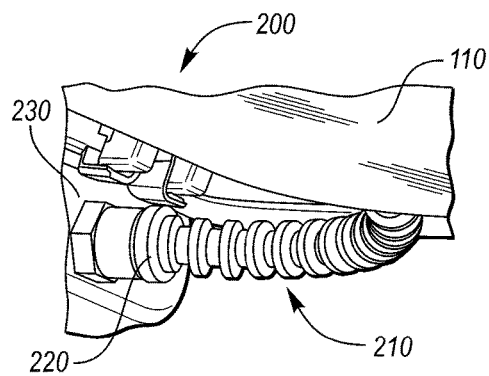
FIG. 3B is an enlarged partial perspective view of the cargo area shown in FIG. 3A.

FIGS. 3A and 3B depict rear partial and enlarged views, respectively, of the vehicle 100 from a low angle. Cargo area 115 is defined beneath package tray 110 such that additional cargo items can be stored below the package tray when the vehicle liftgate is open. Also beneath package tray 110 is umbrella drainage system 200. Umbrella drainage system 200 comprises a flexible drain hose 210 which extends from package tray 110, and into the vehicle 100's existing body drainage system 230. Drain hose 210 is flexible such that movement of the package tray 110, such as when the liftgate is opened, will not disconnect the drain hose 210. Drain hose 210 is made of any material with sufficient flexibility to remain connected to the package tray 110 and umbrella drainage system 200 when the package tray 110 is lifted. Drain hose 210 is connected to the existing body drainage system 230 via a push-in connector 220.

The drain hole 140 of package tray 110 is fluidly connected to the flexible drain hose 210. Water exiting drain hole 140 enters umbrella drainage system 200, flows through the drain hose 210, and is expelled from the vehicle 100 using an existing body drainage system 230. Existing body drainage system 230 is located within the vehicle 100 body, in cavities C of the vehicle frame 102, and expels water to outside the vehicle via a routed hose/tube system in the cavities and exit hole in the vehicle body. Existing body drainage system 230 may be, but is not limited to, a sunroof drainage system or a routed system and exit for vehicles without a sunroof.

Figure 4A:
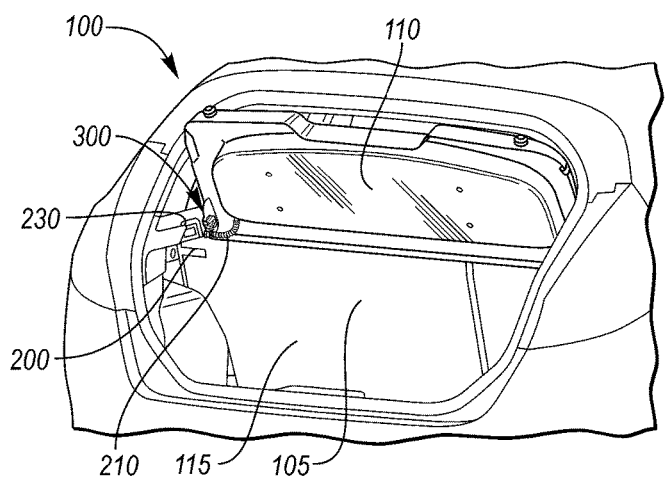
FIG. 4A is a partial perspective view of an exemplary vehicle having a cargo area with a package tray in a lifted position.
Figure 4B:
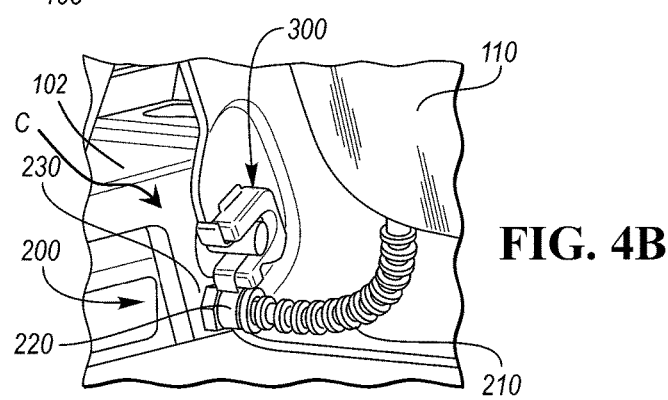
FIG. 4B is an enlarged partial perspective view of the cargo area shown in FIG. 4A.

FIGS. 4A and 4B depict the package tray 110 in a lifted position via a rotation around a hub, shown as the rotation package tray body attachment 300. Package tray body attachment 300 may be any attachment mechanism used for installing package trays in vehicle cargo areas. When in the lifted position (such as when the liftgate of the 5-door vehicle 100 is open), the umbrella drainage system 200 remains functional, and umbrella holders 120 retain the stored umbrellas in the umbrella storage receptacle 125 to prevent damage to the umbrellas and other cargo and harm to the passengers in the rear seat 105. The drain hose 210 remains connected to the package tray 110 and to the vehicle body when the package tray 110 is lifted due to the flexible nature of the drain hose 210.

Figure 5:
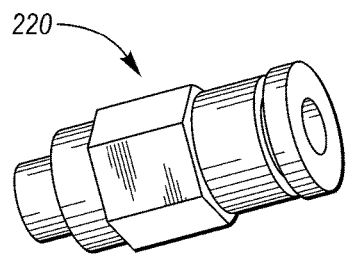
FIG. 5 is a perspective view of a push-in connector.

FIG. 5 depicts an exemplary push-in connector 220 for connecting the umbrella drainage system 200 to the existing body drainage system 230. The push-in connector provides for easy insertion and removal from the drain hose 210 and the existing body drainage system 230. One end of push-in connector 220 inserts into the existing body drainage system 230, and the distal end inserts into the drain hose 210 to provide a sealed fluid connection to allow water to flow through the connector 220 without dripping from either connection point. Although a push-in connector 220 with round geometry is shown in FIG. 5, other configurations of an easily installable and removable push-in connector may be used.

Figure 6:
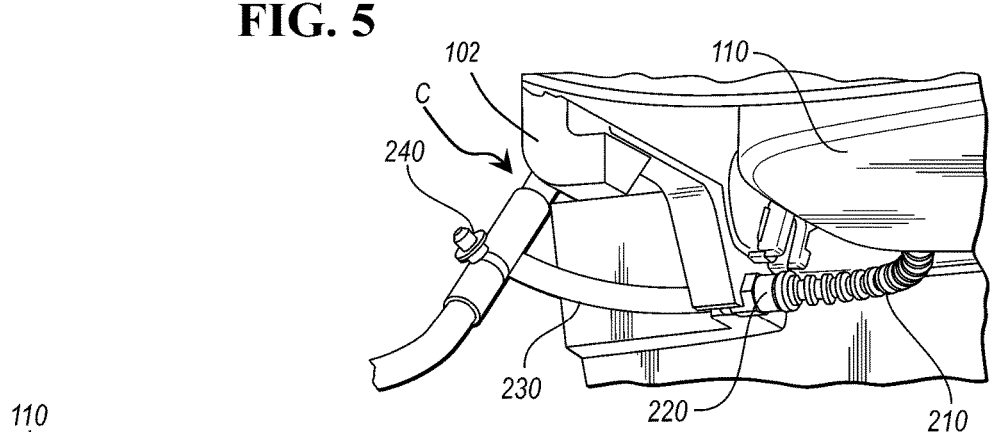
FIG. 6 is a partial perspective view of the connection of a package tray for a cargo area of a vehicle to an existing vehicle body drainage system.

FIG. 6 depicts the umbrella drainage system 200 connected with the existing body drainage system 230. The package tray 110 is connected to the existing body drainage system 230 via a flexible drain hose 210 and push-in connector 220. The existing body drainage system 230 may comprise a T-connector 240 to connect the push-in connector 220 to the drain tubes in cavities C in the vehicle frame 102 of the vehicle body. Although only a portion of the routed hose/tube system is shown, the existing body drainage system 230 may comprise an extensive network of hoses/tubes in the vehicle frame to allow for water drainage from, for example, a sunroof or door frame.

Figure 7A:
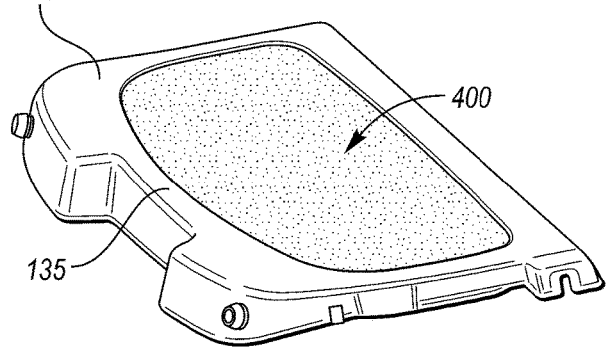
FIG. 7A is a perspective view of a package tray with a cover in a closed position.
Figure 7B:
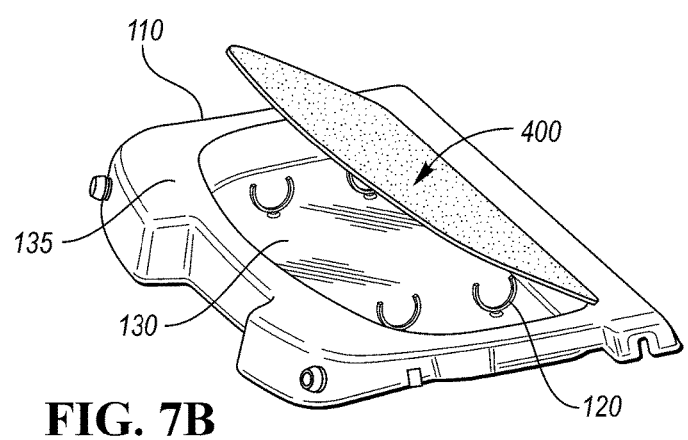
FIG. 7B is a perspective view of a package tray with a cover in an open position.

FIGS. 7A and 7B depict the package tray 110 with a cover 400. Cover 400 covers the umbrella storage receptacle 125 defined by package tray frame 135. FIG. 7A shows the cover 400 in a closed position. FIB. 7B shows the cover 400 in an open position, revealing the umbrella storage receptacle 125, umbrella holders 120, and stored umbrellas (not shown). The cover 400 may be connected by, but is not limited to, a hinge.

FIGS. 8A, 8B, and 8C depict a rear view of the package tray 110. FIG. 8A shows the liftgate package tray attachment 310 for connecting the package tray 110 to the liftgate of a 5-door vehicle. Upon opening the liftgate, liftgate package tray attachment 310 pulls a front side of the package tray with the liftgate, such that the package tray is tilted in the lifted position, as shown in FIGS. 4A and 4B, while the body package tray attachment 300 provides rotation at the rear portion (near the rear seat 105). Lifting the package tray 110 upon opening the liftgate provides easy access to the cargo area 115 beneath the package tray 110.

Angled surface 130 is shown to cooperate with umbrella drainage system 200 at the lower end of the angled surface 130 via the drain hole 140. Flexible drain hose 210 connects the package tray 110 at the drain hole 140 with the existing body drainage system 230 via push-in connector 220. In FIG. 8B, the umbrella storage system 200 is shown without flexible drain hose 210 to show drain hole 140 and push-in connector 220. FIG. 8C shows flexible drain hose 210 fluidly connecting the drain hole 140 and push-in connector 220.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle cargo space comprising:
 a package tray cooperating with a rear seat defining a cargo area beneath the package tray, the package tray having an umbrella storage receptacle with a drain hole; and
 an umbrella drainage system having a flexible hose within the cargo area fluidly connected to the package tray and a body drainage system such that water drains from the receptacle into the hose for expulsion via the body drainage system.

2. The vehicle cargo space of claim 1, wherein the umbrella storage receptacle has an angled surface to promote water flow due to gravitational force.

3. The vehicle cargo space of claim 1, wherein the umbrella storage receptacle has at least one c-clip configured to retain at least one umbrella.

4. The vehicle cargo space of claim 1, wherein the umbrella drainage system is connectable to the body drainage system via a push-in connector.

5. The vehicle cargo space of claim 1, wherein the receptacle of the package tray is impervious to water.

6. The vehicle cargo space of claim 1, further comprising a hinged cover configured to enclose the umbrella storage receptacle in a closed position and reveal the umbrella storage receptacle in an open position.

7. The vehicle cargo space of claim 1, wherein the body drainage system is an existing water drainage system cooperating with cavities in a vehicle frame.

8. An umbrella drainage system for a vehicle comprising:
 a flexible hose located in a cargo area defined by a rear seat and a package tray, the hose being fluidly cooperable with a drain hole in a lower end of an angled surface of the tray and a body drainage system such that water flows from stored umbrellas down the angled surface through the drain hole and hose for expulsion through the body drainage system.

9. The umbrella drainage system of claim 8, wherein the flexible hose is removably connected to the body drainage system via a push-in connector.

10. The umbrella drainage system of claim 8, further comprising a hinged cover configured to cover the package tray in a closed position and uncover the package tray in an open position.

11. The umbrella drainage system of claim 8, wherein umbrellas are retained on the angled surface by at least one c-clip.

12. The umbrella drainage system of claim 8, wherein the angled surface of the package tray is impervious to water.

13. The umbrella drainage system of claim 8, wherein the body drainage system is an existing water drainage system cooperating with cavities in a vehicle frame.

14. An umbrella storage system for a vehicle, comprising:
 a package tray for a vehicle cargo space, the package tray having an angled surface, a frame around the surface defining a storage cavity, and a drain hole; and
 at least one umbrella holder on the surface for storing umbrellas in the storage cavity,
 wherein the angled surface is configured to drain water from stored umbrellas through the drain hole due to gravity.

15. The umbrella storage system of claim 14, further comprising a flexible hose connectable to the package tray at one end such that the hose fluidly cooperates with the drain hole, and to a vehicle drainage system at a distal end such that the hose fluidly cooperates with the vehicle drainage system.

16. The umbrella storage system of claim 15, wherein the flexible hose is connected by a push-in connector.

17. The umbrella storage system of claim 14, further comprising a hinged cover configured to cover the storage cavity in a closed position and reveal the storage cavity in an open position.

18. The umbrella storage system of claim 14, wherein the umbrella holder is a c-clip.

19. The umbrella storage system of claim 14, wherein the umbrella holder is a hook and loop fastener.

20. The umbrella storage system of claim 14, wherein the angled surface is impervious to water.

* * * * *